United States Patent
Mattson, Jr.

(10) Patent No.: US 6,317,870 B1
(45) Date of Patent: Nov. 13, 2001

(54) SYSTEM AND METHOD FOR OPTIMIZATION OF INTER-MODULE PROCEDURE CALLS

(75) Inventor: James S. Mattson, Jr., Campbell, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/258,564

(22) Filed: Feb. 26, 1999

(51) Int. Cl.[7] .................................................. G06F 9/445
(52) U.S. Cl. ................................................................ 717/4
(58) Field of Search .................... 717/3, 4, 5, 11

(56) References Cited

U.S. PATENT DOCUMENTS 6,026,235 * 2/2000 Shayghnessy ........................ 395/704
6,154,878 * 11/2000 Saboff ..................................... 717/11

* cited by examiner

*Primary Examiner*—Mark R. Powell
*Assistant Examiner*—Michael B. Holmes (57) ABSTRACT

A system and method are described for providing optimization for software inter-module procedure calls. The system provides for a program linker to translate a non-executable program into a computer program. The program linker also creates an import stub when the program linker encounters a call instruction to an unresolved module in the computer program. The program linker further modifies the call instruction to the unresolved module to be a call instruction to the created import stub. The import stub determines a location of the unresolved module a first time the unresolved module is called. The import stub then modifies the call instruction to the unresolved module the first time the unresolved module is called to be a direct call the unresolved module at the location determined after the first time the unresolved module is called.

20 Claims, 7 Drawing Sheets

SYSTEM AND METHOD FOR OPTIMIZATION OF INTER-MODULE PROCEDURE CALLS

BACKGROUND OF THE INVENTION

1. Field of the Invention

The present invention is generally related to computer programs and, more particularly, is related to a system and method for efficiently sharing code, specifically, generating software intermodule procedure calls.

2. Description of Related Art

As is known in the computer and software arts, an executable file is typically composed of several separately compiled object modules and libraries. In the past, all of the code necessary to build an executable file was usually linked into one monolithic file. Nowadays, it is more likely that an executable file generated by a compiler and linker will be incomplete, requiring a plurality of shared libraries (or dynamically linked libraries, in OS/2 and Windows parlance). The base executable program is linked together with any dependent shared libraries at load time to produce a complete program.

There are many advantages to the foregoing configuration and technique. In particular, common functionality, such as the standard input/output [I/O] facilities of the C language, for example, can be shared among all of the processes running on the system, rather than requiring that each have its own private copy. When a patch or bug fix is required for a routine within a shared library, the vendor can ship a new library, and all of the programs that depend on the library will automatically pick up the new code the next time they are executed, without the need for recompilation.

Unfortunately, the code sharing configuration and technique comes at the price of a performance penalty. Functions within a load module (the base image for a particular program or any shared library) can use efficient calling sequences when invoking other functions within the same load module, because the complete physical layout of the module is known at link time. Typically, the calling sequence involves a program counter relative branch from the calling function to the destination. However, calls between dynamically linked modules use more time consuming calling sequences, because the relative placement of the calling module and the called module are not known until runtime. In some embodiments, there is also an additional large performance penalty to modify code for all inter-module calls when the program is loaded.

One solution to this performance penalty problem is to introduce the notion of an import stub. Suppose that a function F in module A calls a function G in module B. The code for function F is compiled as if the code for function G is in the same module, and the displacement of the called function G in module B is left for the linker to fix up. When the linker discovers that the called function G in module B is not in the same module A, the linker creates an import stub for the called function G in module B in the calling module's module A. While there may be many calls to function G in module B from different locations in module A, all of the calls are fixed up to pass control to the same import stub. Then, at load time, only the import stubs code has to be modified.

There should be as many import stubs as the number of external functions referenced from within the module. In general, this will be less than the total number of calls to external functions, so the amount of work required at load time is reduced.

A further improvement is to have the import stub perform the symbol table lookup the first time it is invoked (i.e., "bind-on-reference"). This improvement reduces the load time overhead to zero, but it involves somewhat more work the first time the import stub is executed. The problem with this technique is that every inter-module function call has to pass control through an import stub which introduces extra overhead vis-à-vis intra-module function calls.

Heretofore, software developers have lacked a system and method for accomplishing code sharing, particularly, inter-module function calls, in an more efficient way.

SUMMARY OF THE INVENTION

The present invention provides a system and method for efficient intermodule procedure calls. Briefly described, in architecture, the system can be implemented as follows. The system provides for a program linker to translate a non-executable program into the computer program. The program linker also creates an import stub when the program linker encounters a call instruction to an unresolved module in the computer program. The program linker further modifies the call instruction to the unresolved module to be a call instruction to the created import stub. The import stub determines a location of the unresolved module a first time the unresolved module is called. The import stub then modifies the call instruction to the unresolved module the first time the unresolved module is called to be a direct call the unresolved module at the location determined after the first time the unresolved module is called.

The present invention can also be viewed as providing a method for efficient code sharing. In this regard, the method can be broadly summarized by the following steps: The import stub just passes control to the external function. It is an added call in between the caller and the callee when the two are in separate load modules. The import stub knows the location of the caller and the location of the callee, so that whenever the import stub is executed, the import stub can dynamically patch the caller to pass control directly to the callee in the future. Although that particular caller will never go through the import stub again, there may be other callers within the same load module that will. Each call site will be patched, or modified, to transfer control directly to the external target the first time that it passes control through the import stub.

The present invention has numerous advantages, a few of which are delineated hereafter as merely examples.

An advantage of the invention is that call sites which are never executed will not be patched in order to reduce program execution time. In the worst case, each call site will be executed one or more times, and the patching overhead will be just as high as it would have been for the loader to fix up each and every call site at load time. The difference is that the expense is incurred incrementally, which is generally more acceptable to the user of the program than incurring all of the expense at load time. Also, this is the worst case expense. In typical program execution, many call sites to external targets will never be executed, and in accordance with this invention, they will not be patched to reduce program execution time.

Another advantage of the present invention is that it is simple in design, and efficient in operation.

Another advantage of the present invention is that every invocation of a modified call instruction will be more efficient than going through an import stub. Thus, call sites which are visited many times during program execution will exhibit a performance improvement.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. In the drawings.

DETAILED DESCRIPTION OF THE INVENTION

The present invention will now be described in detail with reference to the drawings. Although the invention will be described in connection with these drawings, there is no intent to limit it to the embodiment or embodiments disclosed therein. On the contrary, the intent is to include all alternatives, modifications, and equivalents included within the spirit and scope of the invention as defined by the appended claims.

Figure 1:
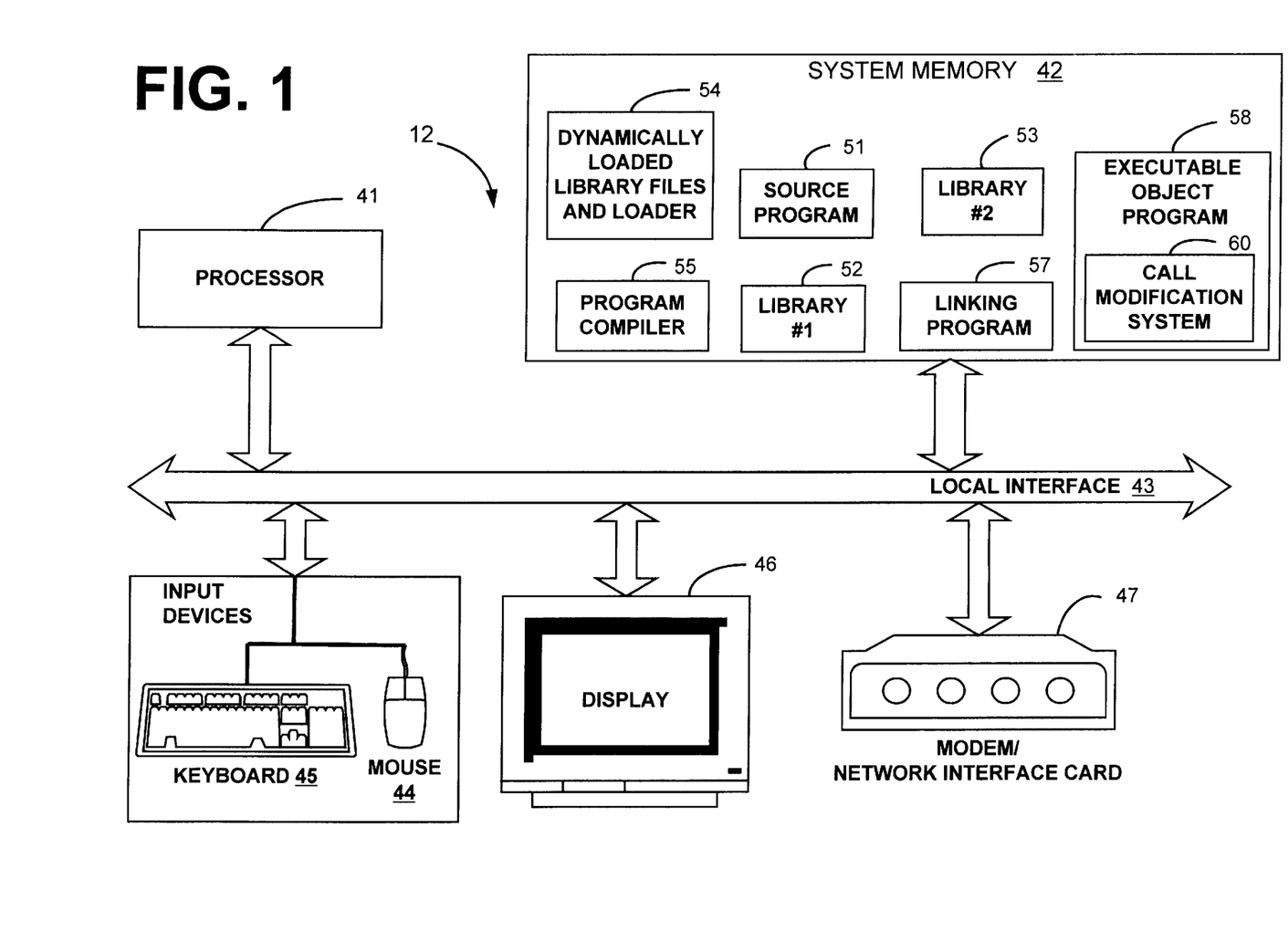
FIG. 1 is a block diagram of a user system showing the object program containing the fix-up call system of the present invention.

As illustrated in FIG. 1, the computer system 12 comprises a processor 41 and a system memory 42 with an operating system (not shown, which is executed by the processor 41). The processor 41 accepts data from system memory 42 over the local interface or bus 43. The system memory 42 can be either one or a combination of the common types of memory, for example, but not limited to, erasable programmable read only memory (EPROM), electronically erasable programmable read only memory (EEPROM), flash memory, programmable read only memory (PROM), random access memory (RAM), read only memory (ROM), flash memory, dynamic random access memory (DRAM), static random access memory (SRAM), system memory, or nonvolatile memory such as disk drives, tape drives, compact disc read only memory (CD-ROM) drives, cartridges, cassettes, or memory located on a network server. Direction from the user can be signaled to the processor 41 by using the input devices, for example, but not limited to, a mouse 44 and keyboard 45. The action input and/or result output can be displayed on an output device, for example, a display device 46. The computer system 12 includes a user network interface type programs for use in accessing data on a network. These user network interface type programs reside in system memory 42 and access communication facilities modem 47 to transport to and from other resources connected to a network (not shown).

The call modification system 60 of the present invention can be implemented in hardware, software, firmware, or a combination thereof. In the preferred embodiment, the call modification system 60 is implemented in software or firmware that is stored in a memory, such as the system memory 42, and that is executed by a suitable instruction execution system, such as processor 41. While the system configuration could take many forms, the diagram of FIG. 1 illustrates that the call modification system 60 resides in system memory 42. The source program 51 is processed by the program compiler 55.

The program compiler 55 generates a compiled code 56. The compiled program object code 56 includes an object code version of the call modification system 60. The compiled program object code 56 is further processed by the linking program 57 to produce an executable object program 58 with executable call modification system 60. As stated before, calls within the source program 51 are compiled as if the called module is within the source program 51 itself. When the linking program 57 processes the compiled object program code 56 generated by the program compiler 56, the linker program 57 is left to determine the offset from the compiled object program 56 generated by the program compiler 56 to the called module, e.g., library 52 (library #1), library 53 (library #2), or a dynamically loaded library 54, or the like. When the linking program 57 discovers that the called module is not in the same module as the compiled object program code 56, the linking program 57 creates an import stub for the called module in the compiled object program code 56. The import stub just passes control to the called external function and is just an additional offset displacement between the caller module and the callee module when the two modules are in separate load modules.

The first embodiment of the present invention involves a call modification system 60. Upon the first execution of an import stub that can dynamically patch (i.e., rewrite code in), the calling executable object program 58 thereafter passes control of the execution directly to the called module without the intermediate step of jumping to the import stub again.

Figure 2:
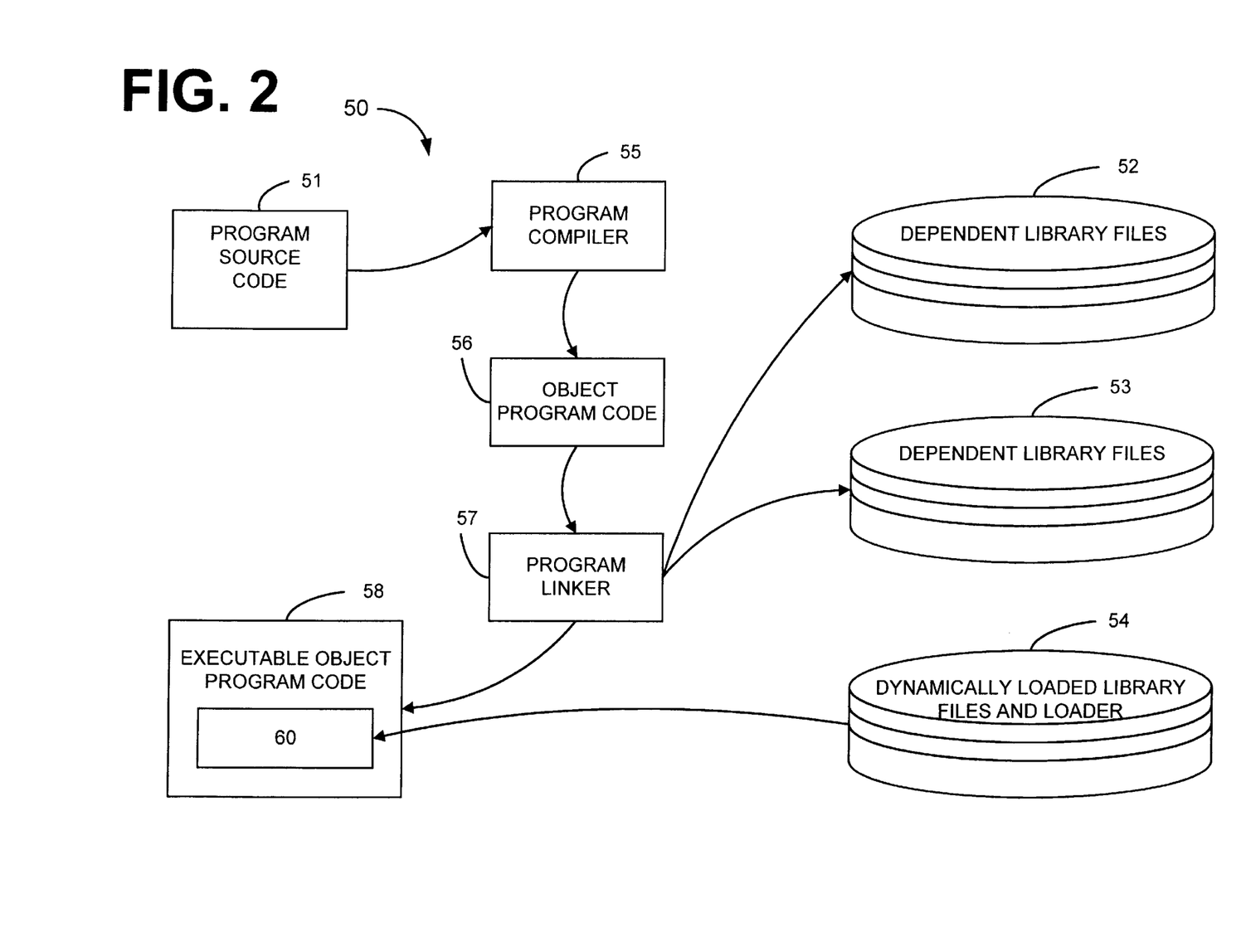
FIG. 2 is a block diagram of the process for generating the fix-up call code in the object program code.

Illustrated in FIG. 2 is a diagram illustrating a process to convert a program source code 51 into an executable program object code 58 containing the call modification system 60. The program source code 51 is input into the program compiler 55 to generate a compiled object program code 56 that is then processed by the program linker 57. The program compiler 55 initially converts the program source code 51 into compiled program object code 56 that performs the executable steps defined in the program source code 51. The program compiler 55 lacking the location of dependent library files 52 and 53 and dynamically loaded library files 54 generates a call to be processed by the program linker 57 in order to determine the displacement from the program object code 58 to the dependent library files 52, 53, and 54.

The program linker 57 takes the unresolved calls in the compiled program object code 56 and determines their displacement to dependent files 52 and dependent files 53.

The program linker 57 of the present invention creates an import stub that allows the program object code 58 to determine the called module at runtime. The utilization of these dynamically linked modules are more expensive because of the relative placement of the caller module and the callee module are not known until runtime of the program object code 58.

The dynamically linked modules are enabled by a dynamic loader. The dynamic loader 54 is an operating system component which is responsible for collecting all of the necessary components of the program (executable file and libraries) at run time and laying them out in memory. It is also responsible for loading dynamically linked libraries 54 into memory as the running program requires them.

Figure 3:
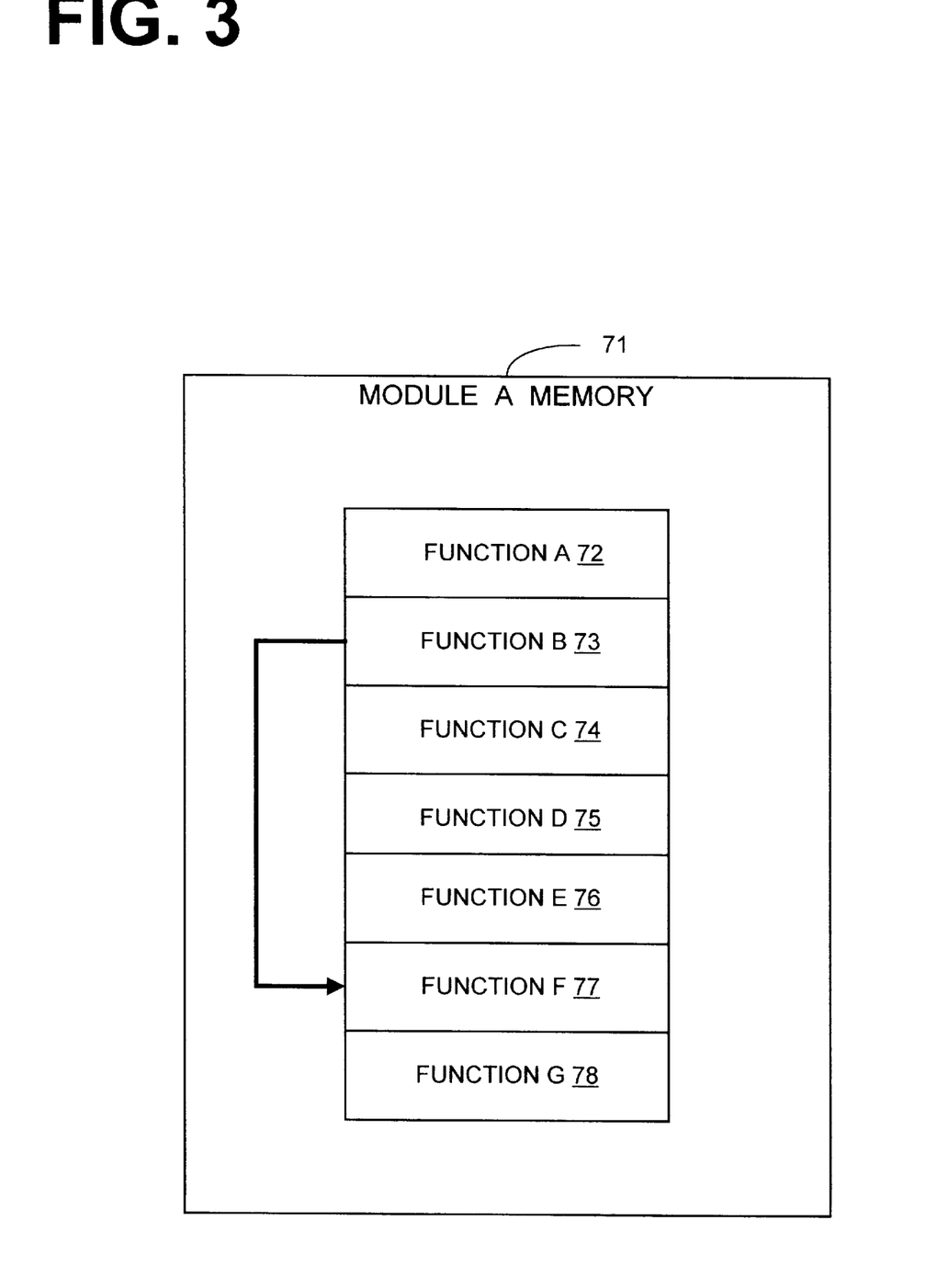
FIG. 3 is a block diagram of a known method for an intra-module call utilizing a one-step jump.

Illustrated in FIG. 3 is an example of a prior art methodology of performing an intramodule call. In the prior art, an intramodule call is actually a call within module A 71 from function B 73 to function F 77. The call to function F 77 is actually encoded as a call to the program counter plus displacement, where the displacement is the distance from the program counter to the start of function G 77. This value is filled in by the linker program 57. The user is to note that this is a single step intramodule call.

Figure 4:
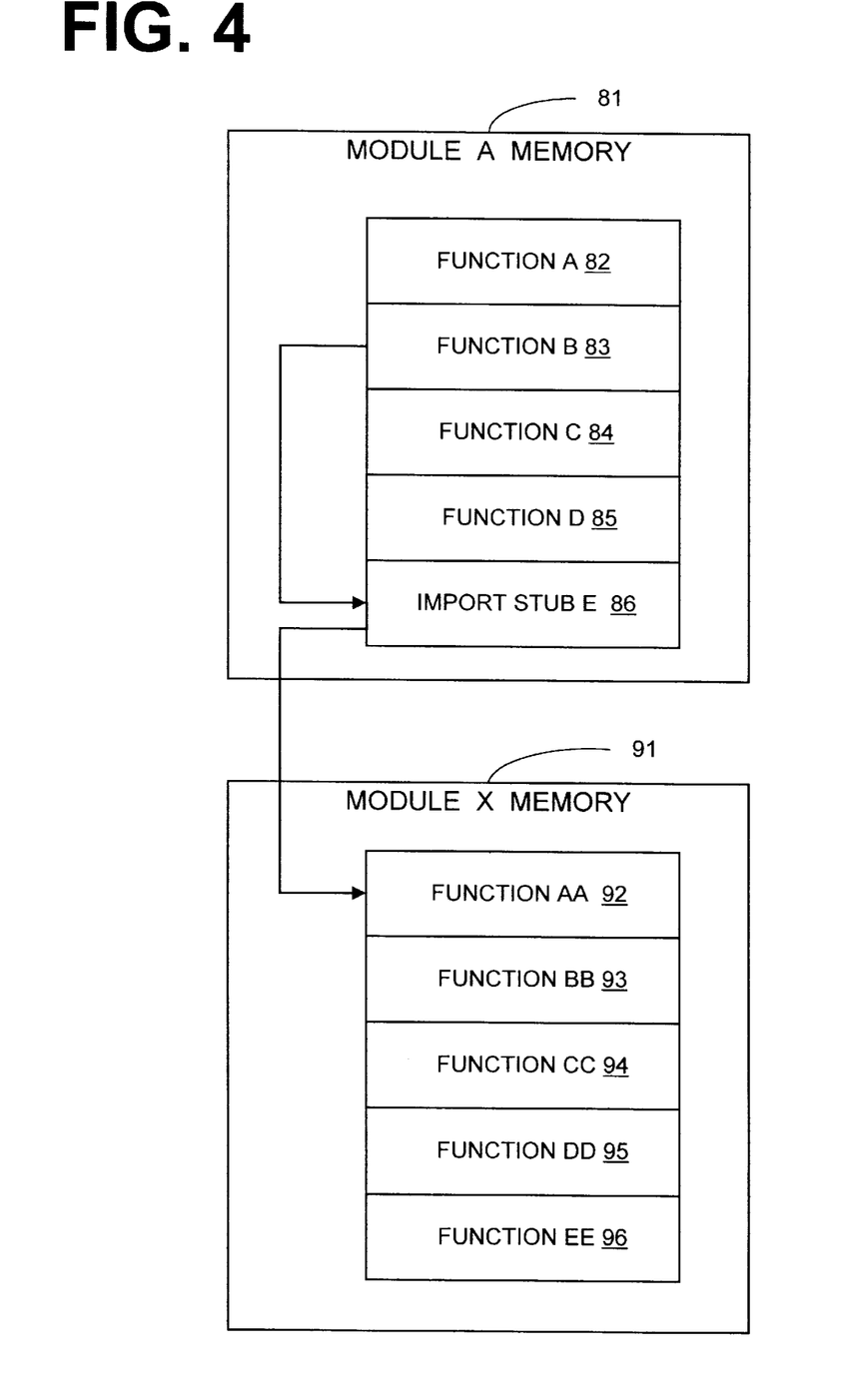
FIG. 4 is a block diagram of a known method for an inter-module call utilizing two branch steps.

Illustrated in FIG. 4 is the intermodule call from module A 81 to module X 91 of the prior art. When function B 83 within module A 81 calls function AA 92 within module X 91, the function B 83 first calls the import stub E 86 that was created by the linker program 57. The import stub E 86 then branches to the external function AA 92 within module 91. The call still utilizes the intramodule call as described in FIG. 3 using a call (program counter plus displacement) to the import stub E 86. The import stub E 86 then computes a second program counter plus displacement to function AA 92 within module X 91. The displacement from import stub E 86 to function AA 92 within module X 91 is known only to the dynamic loader that is noted above. This branch from the import stub E 86 to the function AA 92 within module X 91 is computed either at load time or during the first call. It should be noted that this is a two step functional call for function B 83 to call function AA 92 with the intermediate step utilizing the import stub E 86.

Figure 5A:
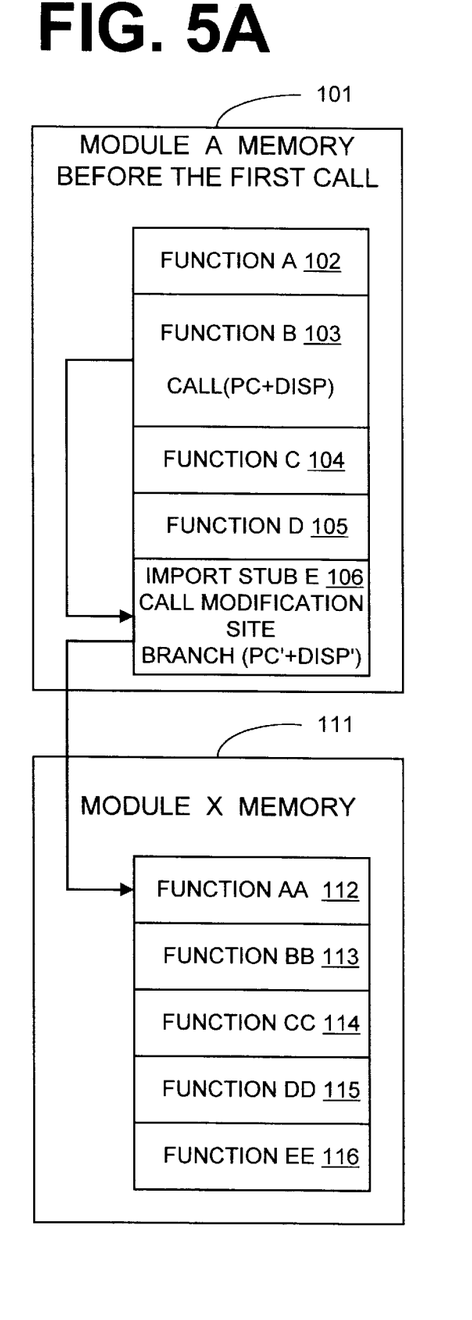
FIG. 5A is a block diagram of the present invention showing the two branch steps and the call fix-up site of the present invention as shown in FIG. 1.
Figure 5B:
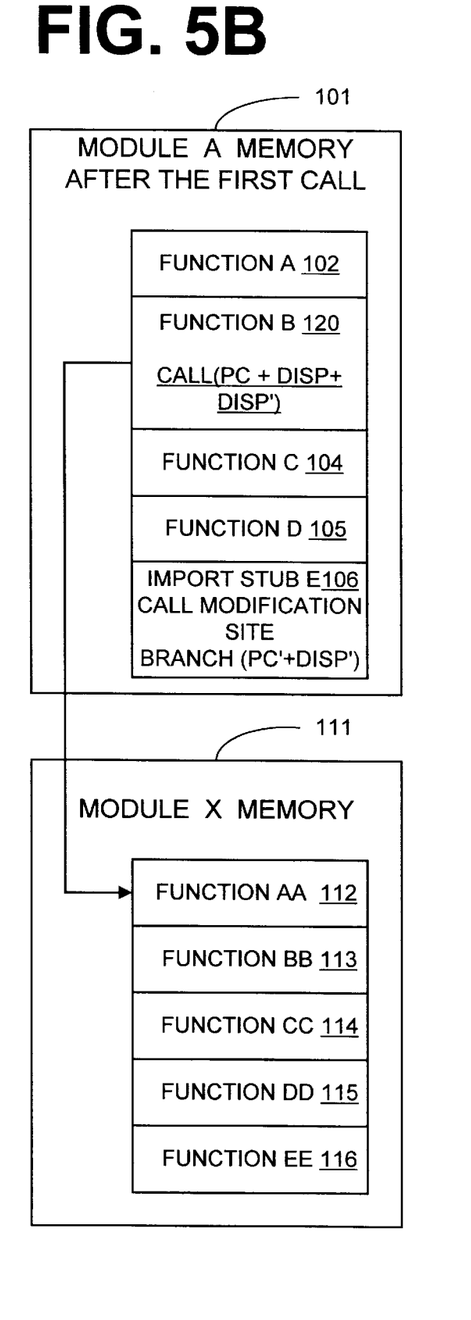
FIG. 5B is a block diagram of the present invention showing a one step branch after the first call utilizing the call fix-up system of the present invention as shown in FIG. 1.

Illustrated in FIG. 5 is the call modification method of present invention. As shown in FIG. 5A, which is a snapshot of module A 101 prior to the first call, the function B 103 consists of a intermodule call that on the first execution of such call, calls import stub E 106 which contains a fix-up call site and a branch to the called function AA 112 residing in module X 111. The dynamic loader again calculates the displacement is between the import stub E 106 and the destination function AA 112 in module X 111. The import stub E 106 calculates the displacement between any caller (function B 103 in the example) and the destination function AA 112 in module X 111. Once this displacement is computed, the import stub E 106 fix-up call site code of the present invention modifies the call instruction within function B 103 to include a call with an offset of the program counter plus the displacement to the import stub E 106. Furthermore, the call includes the displacement from the import stub E 106 to the function AA 112 within memory module X 111, and modifies function B 103 to become function B 120 so that any future calls from function B 120 to function A 112 within module X 111 will be a direct single step call that will branch directly to the target function AA 112 on subsequent execution.

Figure 6:
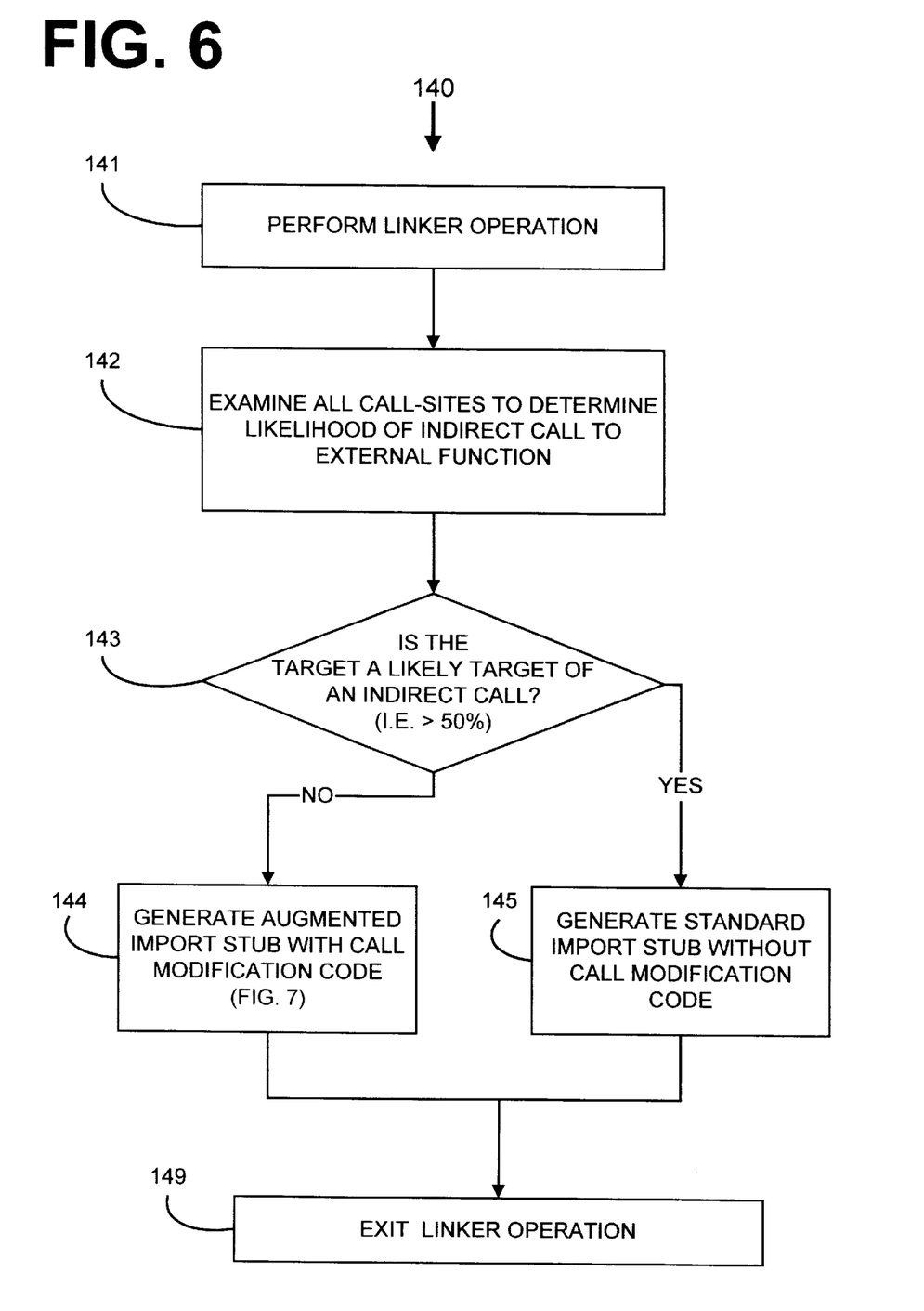
FIG. 6 is a flow chart of the preferred method to perform the generation of the import stub with the fix-up code system of the present invention as shown in FIGS. 1, 5A, and 5B.

Illustrated in FIG. 6 is a flow chart showing the architecture, functionality, and operation of process for the program linker 57 that generates an import stub for an internal function AA as shown in FIG. 5. First, the linker program 57 is executed at step 141. The linker program 57 first examines all call sites within the code to determine the likelihood of an indirect call to an external function at step 142.

An indirect call is a call wherein the target is given as the contents of a machine register or the contents of a memory location. A function which is the target of an indirect call will have its address loaded into a machine register or stored to a memory location somewhere in the body of the program. Either operation requires a linker fix-up (only the linker knows the function's address), so the linker can identify likely targets of indirect calls.

Next, the linker program 57 determines if the likelihood of an indirect call is likely to occur at step 143. If the linker program 57 determines that indirect calls are not likely, the linker program 57 generates an augmented import stub with the fix-up code of the present invention at step 144. This generation of the call modification system 60 is herein defined in further detail with regard to FIG. 7.

If the linker program determines that there is a possibility of an indirect call at step 143, the linker program then generates the standard import stub without the fix-up code of the present invention at step 145. After the generation of the import stub in either step 144 or 145, the linker program 57 then exits the linker operation at step 149.

Figure 7:
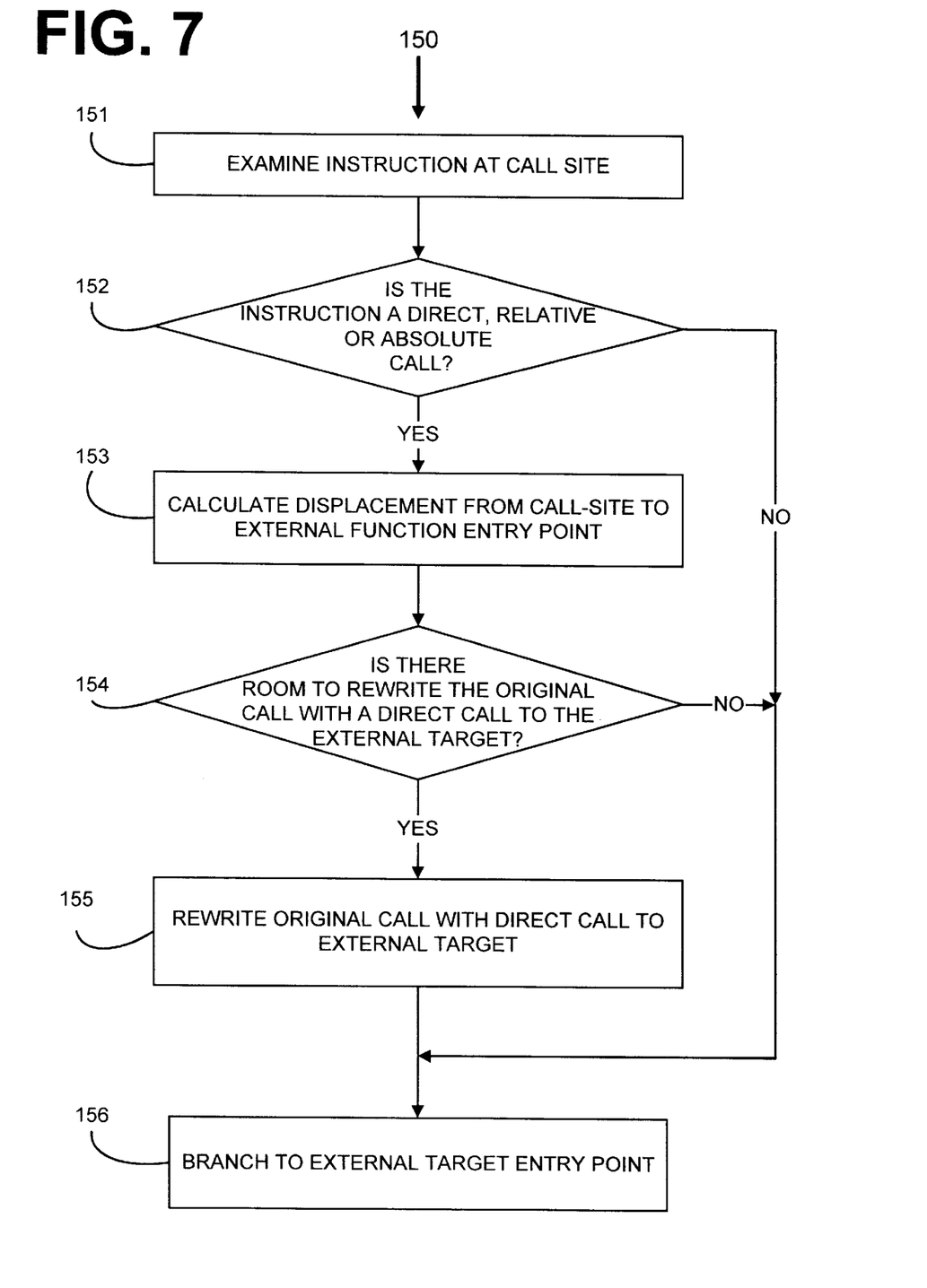
FIG. 7 is a flow chart of the process that generates the fix-up code for re-writing an original call with a direct call to an external target as shown in FIG. 6.

Illustrated in FIG. 7, the generate augmented import stub with fix-up code process 150 examines the instruction at the call site from which it was called. The generated augmented import stub with call modification system 60 process then determines if the instruction at the call site is a direct, relative, or absolute call at step 152.

If the instruction at the call site is not a direct, relative or absolute call, the generated augmented import stub with call modification routine 150, then continues to step 156 and branches to the external target entry point. If the instruction at the call site is a direct, relative, or absolute call, then the generated augmented import stub with call modification routine 150 then calculates the displacement from the call site to the external function entry point at step 153. The generated augmented import stub with call modification routine 150 then determines if there is room to rewrite the original call instruction with a direct call to the external target called site at step 154.

If there is room to rewrite the original call with a direct call to the external target, the generate augmented import stub with call modification routine 150 rewrites the original call with a direct call to the external target at step 155. The generate augmented import stub with call modification routine 150, then branches to the external target entry point at step 156.

If, however, there is insufficient room to rewrite the original call instruction with a direct call instruction to the external target at step 154, the generate augmented import stub with call modification routine 150 branches to step 156 to branch to the external target entry point and continues execution at the target entry point.

A potential obstacle with this invention involves the general problems of code sharing. Typically, the import stubs are private to each process, but the code within the load modules is shared among multiple processes. Different processes will generally require different sets of load modules, and the load modules that they share may be loaded at different memory locations. Thus, the displacement between caller and callee in an inter-module call may be different for two different processes that share the code for both. If one process patches the call site to branch directly to the callee, the resulting code may not be valid for the other process.

This potential obstacle may be solved if the "copy-on-write" functionality for the code to be patched is supported by the operating system. With copy-on-write, multiple processes will share the code in the shared load module until one of them attempts to modify that code. The process modifying the code then gets a private copy of the page that it has changed. Typical page sizes are 1K, 2K, 4K, or 8K bytes. The processes continue to share the unmodified pages of the load module.

The second potential obstacle is that of dynamically loading and unloading load modules. In most cases, the operating system loader loads the program and all required shared libraries when the program is executed. However, most systems that support shared libraries (or dynamically linked libraries) also provide facilities so that the program can request the loading of additional libraries as it executes. Similarly, the program can request that shared libraries be unloaded when it has finished with the services that they provide. When a load module is unloaded, any references to its functions from other load modules become invalid. Thus, any call-sites which may have been patched become invalid when the target module is unloaded. One possible solution to this potential obstacle is to redirect all intermodule calls back to their import stubs by reverting all copied-on-write pages back to their original, shared state.

The first pass fix-up (i.e., code modification) for inter-module procedure calls is program code, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings.

The embodiment or embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method to optimize an inter-module procedure call in a computer program, the method comprising the steps of:

generating an import stub in said computer program when a call instruction in said computer program calls an unresolved module that is not in a same load module as said computer program;

modifying said call instruction to call said import stub when said call instruction executes said call to said unresolved module;

determining a location of said unresolved module a first time said unresolved module is called; and modifying said call instruction to directly call said unresolved module at said location after said first time said unresolved module is called during execution of said computer program.

2. The method of claim 1, wherein said modifying step further comprises the steps of:

determining if said unresolved module call is an indirect module call; and calculating an offset to said location of said unresolved module, when said unresolved module call is not said indirect module call.

3. The method of claim 2, wherein said modifying step further comprises the step of:

determining if said computer program has sufficient space to modify said call instruction, when said unresolved module call is not said indirect module call.

4. The method of claim 3, wherein said modifying step further comprises the step of:

replacing said call instruction with a direct call instruction to said unresolved module if said computer program has sufficient space for said direct call instruction, when said unresolved module call is not said indirect module call.

5. The method of claim 4, wherein said replacing step further comprises the step of:

using said offset to said location of said unresolved module in said replacing of said direct call instruction.

6. The method of claim 4, further comprising the step of:

replacing said direct call instruction with said call instruction to said import stub, if said unresolved module is unloaded.

7. A system for optimizing inter-module procedure calls in a computer program, said inter-module procedure call optimization system comprising:

a program linker for translating a non-executable program into said computer program, creating an import stub in said computer program when said program linker encounters a call instruction to an unresolved module, and modifying said call instruction to said unresolved module to be a call instruction to said import stub;

wherein said import stub determines a location of said unresolved module a first time said location of said unresolved module is determined; and wherein said import stub modifies said call instruction to directly call said unresolved module at said location after said first time said unresolved module is called during execution of said computer program.

8. The system of claim 7, wherein said import stub further determines if said unresolved module call is an indirect module call, and wherein said import stub calculates an offset to said location of said unresolved module, when said unresolved module call is not said indirect module call.

9. The system of claim 7, wherein said import stub further determines if said computer program has sufficient space to modify said call instruction module, when said unresolved module call is not said indirect module call.

10. The system of claim 9, wherein said import stub further replaces said call instruction with a direct call instruction to said unresolved module if said computer program has sufficient space for said direct call instruction, when said unresolved module call is not said indirect module call.

11. The system of claim 10, wherein said import stub further uses said offset to said location of said unresolved module in said replacing of said direct call instruction.

12. The system of claim 10, wherein said import stub further replaces said direct call instruction with said call instruction to said import stub, if said unresolved module is unloaded.

13. An inter-module procedure call optimization system for optimizing a computer program, said inter-module procedure call optimization system comprising:

means for generating an import stub in said computer program, when a call instruction in said computer program calls an unresolved module that is not in a same load module as said computer program;

means for modifying said call instruction to call said import stub when said call instruction calls an unresolved module;

means for determining a location of said unresolved module a first time said unresolved module is called; and means for modifying said call instruction, by said import stub, to directly call said unresolved module at said location after said first time said unresolved module is called during execution of said computer program.

14. The system of claim 13, further comprising:

means for determining if said unresolved module call is an indirect module call; and means for calculating an offset to said location of said unresolved module, when said unresolved module call is not said indirect module call.

15. The system of claim 14, further comprising:

means for determining if said computer program has sufficient space to modify said call instruction, when said unresolved module call is not said indirect module call.

16. The system of claim 15, further comprising:

means for replacing said call instruction with a direct call instruction using said offset to said unresolved module, when said computer program has sufficient space for said direct call instruction, and when said unresolved module call is not said indirect module call.

17. The system of claim 13, further comprising:

means for replacing said direct call instruction with said call instruction to said import stub, if said unresolved module is unloaded.

18. A computer program product for optimizing inter-module procedure calls in a computer program, said program product comprising:

a computer readable recording medium;

a means recorded on said medium for controlling said execution of said computer program; and a means recorded on said medium for generating an import stub in said computer program, for a call instruction in said computer program that calls an unresolved module that is not in a same load module as said computer program; and a means recorded on said medium for modifying said call instruction to directly call said unresolved module after said first time said unresolved module is called during execution of said computer program.

19. The computer program product of claim 18, wherein the means for modifying includes:

a first routine means, responsive to the import stub, for calculating an offset to said location of said unresolved module, when said unresolved module call is not a indirect module call; and a second routine means, responsive to the import stub, for determining if said computer program has sufficient space to modify said call instruction, when said unresolved module call is not said indirect module call.

20. The computer program product of claim 19, wherein the means for directing includes:

a third routine means, responsive to the means for modifying, for calculating an offset to said location of said unresolved module; and a fourth routine means, responsive to the means for modifying, for replacing said call instruction with a direct call instruction using said offset to said unresolved module, when said computer program has sufficient space for said direct call instruction, and when said unresolved module call is not said indirect module call.

* * * * *